March 26, 1940. E. O. P. THEGE 2,194,917

TORSIONAL VIBRATION DAMPER

Filed July 13, 1938

Inventor:
Edwin Ossian Percival Thege
By James C. Marble
his Attorney

Patented Mar. 26, 1940

2,194,917

UNITED STATES PATENT OFFICE 2,194,917

TORSIONAL VIBRATION DAMPER

Edvin Ossian Parcival Thege, Stockholm, Sweden, assignor to Aktiebolaget Atlas-Diesel, Stockholm, Sweden Application July 13, 1938, Serial No. 219,048
In Sweden January 27, 1938

6 Claims. (Cl. 74—574)

The present invention relates to torsional vibration dampers operating with liquid, for instance of the type in which the dampening action is effected either by stops formed by liquid cushions enclosed between the vibrating part and one or more auxiliary masses, or by checking the auxiliary mass by means of throttling devices or the like provided in the liquid communications within the damper.

The construction of the damper may be of any kind operating according to the above mentioned principles and will not be described in detail, since it is immaterial for the present invention.

In torsional vibration dampers of the kind operating with liquid it has heretofore not been possible to avoid entry of air into the damper and heating of liquid, with resulting generation of gas, due to flow of the liquid under throttling conditions.

Entry of air and generation of gases from the liquid interferes with the reliable operation of the damper and the present invention has for a primary object the elimination of the difficulties heretofore encountered due to the presence of air or fixed gases in the liquid.

The above object is accomplished in accordance with the principles of the present invention essentially through the provision of a device for separating air or gas by centrifuging action, which device is interposed in the liquid supply conduit to the damper and is made in or rigidly connected to the shaft carrying the damper and the vibrations of which are to be damped. Further, in accordance with the invention the separating device and the damper are placed in direct communication with each other through a channel which has no communication with the atmosphere.

Figure 1:
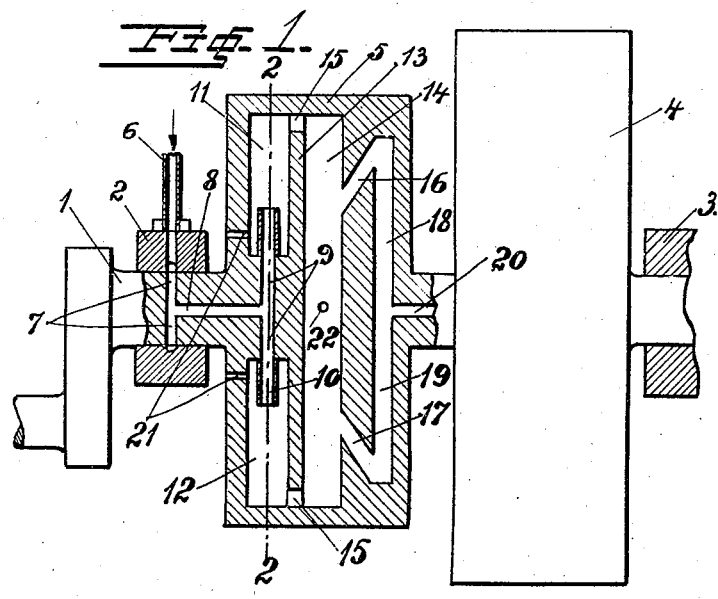
Figure 2:
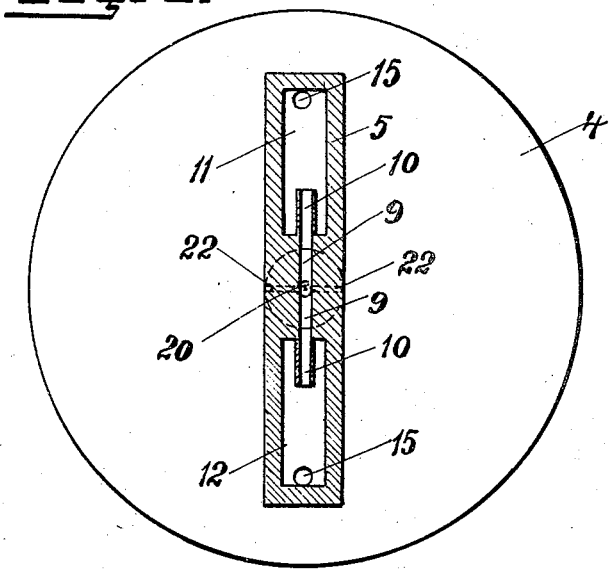

In the annexed drawing one embodiment of such an arrangement is shown diagrammatically. Fig. 1 is a side view of the damper and the appertaining air or gas separating device, the latter being shown in axial section. Fig. 2 is a cross-section along the line 2—2 of Fig. 1.

In the drawing, I designates an engine crank shaft, the vibrations of which are to be damped, and 2 and 3 designate bearings for the said shaft. Provided on the engine shaft is the damper 4. As previously noted, the damper may be of any kind and will not be particularly described or shown. Rigidly secured to or made integral with the engine shaft is an air or gas separating device comprising in this instance a rectangular housing 5, to which the liquid is to be supplied before entering into the damper 4. The liquid is introduced into the system at 6 by way of the bearing 2 and through radial channels 7 to a central axial bore 8 in the shaft. The bore 8 extends into the housing 5 and communicate with radially disposed channels 9 in said housing, to which are connected pipes 10 supplying liquid in the housing. Pipes 10 open into radially disposed pockets 11 and 12 located at the one side of a partition 13, on the opposite side of which there is a chamber 14, with which the pockets 11, 12 communicate through openings 15 made at the outer ends of the partition. Extending outwardly in an oblique direction from the chamber 14 are channels 16, 17, which are connected to radial, inwardly directed channels 18, 19, which open into a common central and axial channel 20 leading to the damper 4. Provided at the inner ends of the pockets 11, 12 in the end wall of the housing are apertures 21 leading to the space outside the housing (the crank chamber) and serving as outlets for air, and similar outlet apertures for air from the chamber 14 are made in the side walls of said chamber. The air outlet apertures 21 and 22 may advantageously be made of small cross-section in order to prevent too great a loss of liquid and pressure in the liquid system.

The liquid supplied to the pockets 11, 12 during the rotation of the damper 4 and the housing 5 will be thrown outwards due to centrifugal force and thereby accompanying air, if any, will be separated and escapes through the apertures 21. The liquid thus separated passes from the pockets 11, 12 through the openings 15 in the partition to the chamber 14 and from there through the channels 16, 17, 18, 19 and 20 to the damper. However, before this takes place a further separation is effected in the chamber 14, whereby air or gases, if any, escape through the outlets 22. Thus, the liquid, which finally enters in the damper 4 through the channel 20, is practically free from air or gases.

Obviously, the invention is not in any way limited to the separating means above described and diagrammatically shown in the drawing, since it may be varied as to its construction according to known principles for centrifuges. The device may be made in the shaft proper or as a part rigidly connected thereto.

What I claim as new, and desire to secure by Letters Patent of the United States of America is:

1. In torsional vibration dampers operating with liquid, a shaft carrying said damper, means for supplying liquid to the damper, including a channel having no communication with the atmosphere, and means on said shaft for separating air or gas through centrifuging and in direct communication with said channel.

2. In torsional vibration dampers operating with liquid, a shaft carrying said damper, means for supplying liquid to the damper, including a channel having no communication with the atmosphere, means on said shaft for separating air or gas through centrifuging and in direct communication with said channel, and movable means for supplying liquid to said separating means.

3. In apparatus of the character described, the combination with a rotatably mounted shaft and a torsional vibration damper carried by said shaft and of the type requiring liquid to be supplied thereto for its operation, of means for supplying liquid to said damper including a centrifuging separator carried by said shaft and operated by rotation of the shaft to remove air or gas from liquid supplied thereto, said separator having a discharge outlet for centrifuged liquid in direct and fixed communication with the inlet of said damper, and means for supplying liquid to said separator.

4. The combination, with a rotatably mounted engine crankshaft, of a vibration damper carried by said shaft and of the type requiring liquid to be supplied thereto, a centrifuging separator carried by said shaft and operated by rotation of the shaft to remove air or gas from liquid supplied thereto, means rotating with the shaft and forming a fixed communication for direct delivery of centrifuged liquid from said separator to the inlet of said damper and means for supplying liquid to said separator.

5. The combination, with a rotatably mounted engine crankshaft, of a vibration damper carried by said shaft and of the type requiring liquid to be supplied thereto for its operation, a centrifuging separator carried by said shaft and operated by rotation of the shaft to separate air or gas from liquid supplied thereto, said separator having an outlet for centrifuged liquid, a channel formed in said shaft and out of communication with the atmosphere for delivering centrifuged liquid directly from said outlet to the inlet of said damper, and means for supplying liquid to said separator.

6. The combination, with a rotatably mounted engine crankshaft and bearings for supporting said shaft, of a vibration damper carried by said shaft and of the type requiring liquid to be supplied thereto for its operation, a centrifuging separator carried by said shaft and operated by rotation of the shaft to separate air or gas from liquid supplied thereto, said separator having an outlet for centrifuged liquid, a channel formed in said shaft and out of communication with the atmosphere for delivering centrifuged liquid directly from said outlet to the inlet of said damper, and means including a channel in said shaft communicating through one of the shaft bearings with a source of liquid supply for supplying liquid to said separator.

EDVIN OSSIAN PARCIVAL THEGE.